United States Patent [19]

Hirs

[11] 3,899,426
[45] Aug. 12, 1975

[54] APPARATUS AND METHOD FOR FILTER SEAL
[75] Inventor: Gene Hirs, Birmingham, Mich.
[73] Assignee: Hydromation Filter Company, Livonia, Mich.
[22] Filed: May 20, 1974
[21] Appl. No.: 471,520

[52] U.S. Cl. ............................ 210/387; 210/400
[51] Int. Cl. ............................................ B01d 33/02
[58] Field of Search .......... 210/138, 333, 387, 400; 277/34, 34.3, 103

[56] References Cited
UNITED STATES PATENTS

| | | | |
|---|---|---|---|
| 2,867,324 | 1/1959 | Hirs | 210/138 X |
| 3,306,458 | 2/1967 | Hirs | 210/333 |
| 3,333,693 | 8/1967 | Hirs | 210/138 X |
| 3,399,778 | 9/1968 | O'Neill | 210/387 |
| 3,478,879 | 11/1969 | Hirs | 210/387 X |
| 3,760,945 | 9/1973 | Davis | 210/400 X |

Primary Examiner—Charles N. Hart
Assistant Examiner—Robert H. Spitzer
Attorney, Agent, or Firm—Cullen, Settle, Sloman & Cantor

[57] ABSTRACT

A pressure filter having fixed, vertically spaced upper and lower frame members includes a seal assembly between the filter frames for preventing the escape of pressurized contaminated liquid. The seal is comprised of a vertically displaceable sealing gasket which is biased upwardly by a plurality of tension springs interconnected between the gasket and the upper frame member. The displaceable gasket is urged downwardly against the lower frame member for sealing purposes during filtration flow by an expansible tube which is retained between the upper frame member and the gasket. The expansible tube in the preferred embodiment is unattached to either the upper frame or the displaceable gasket for purposes of economy in construction, yet a liquid-tight seal is maintained at the regions where the tube contacts the upper frame member and the displaceable gasket. When it becomes necessary to change a filter medium, the pressure inflating the tube is relieved and the displaceable gasket is raised by the tension springs to expose the contaminated medium.

6 Claims, 3 Drawing Figures

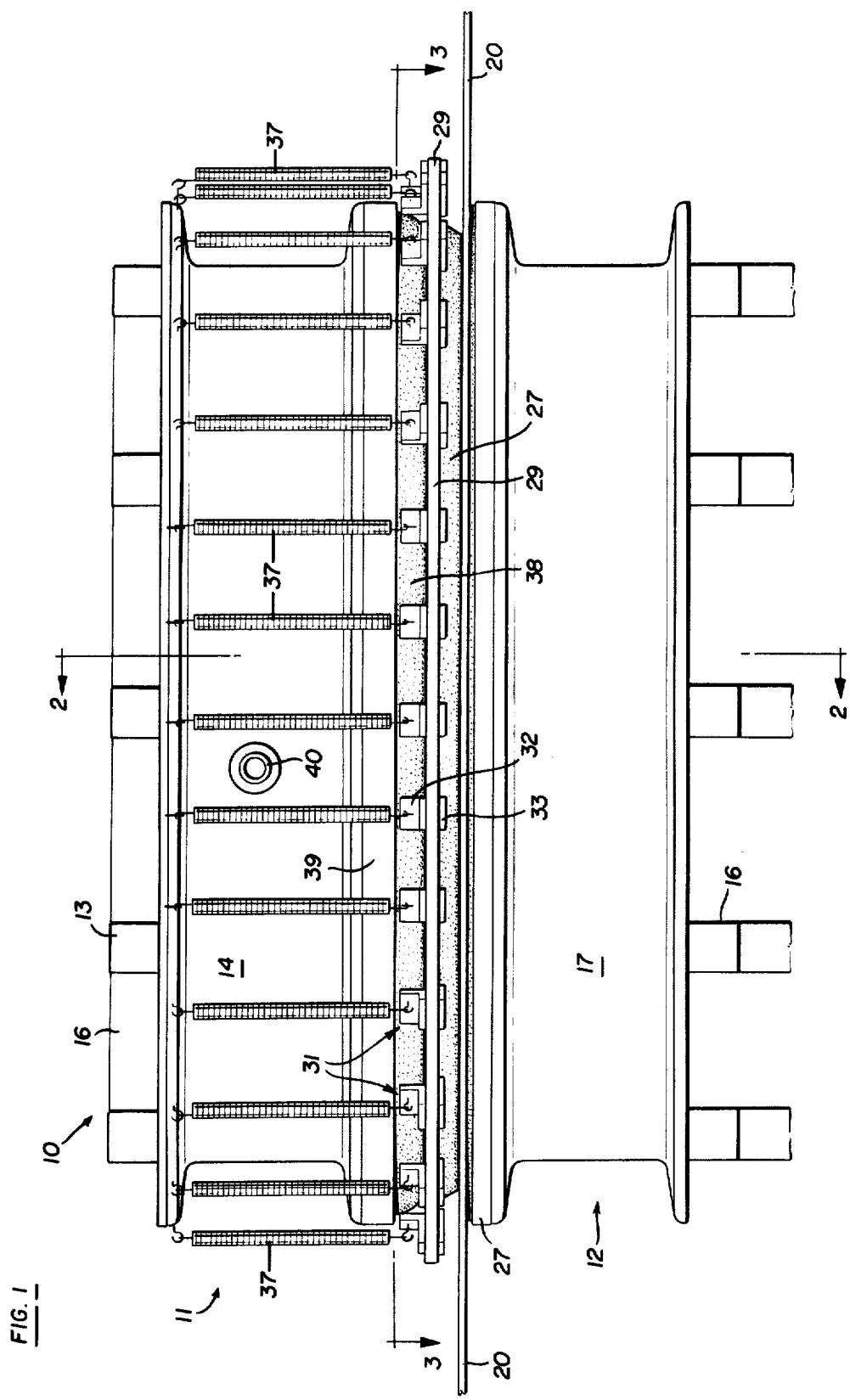

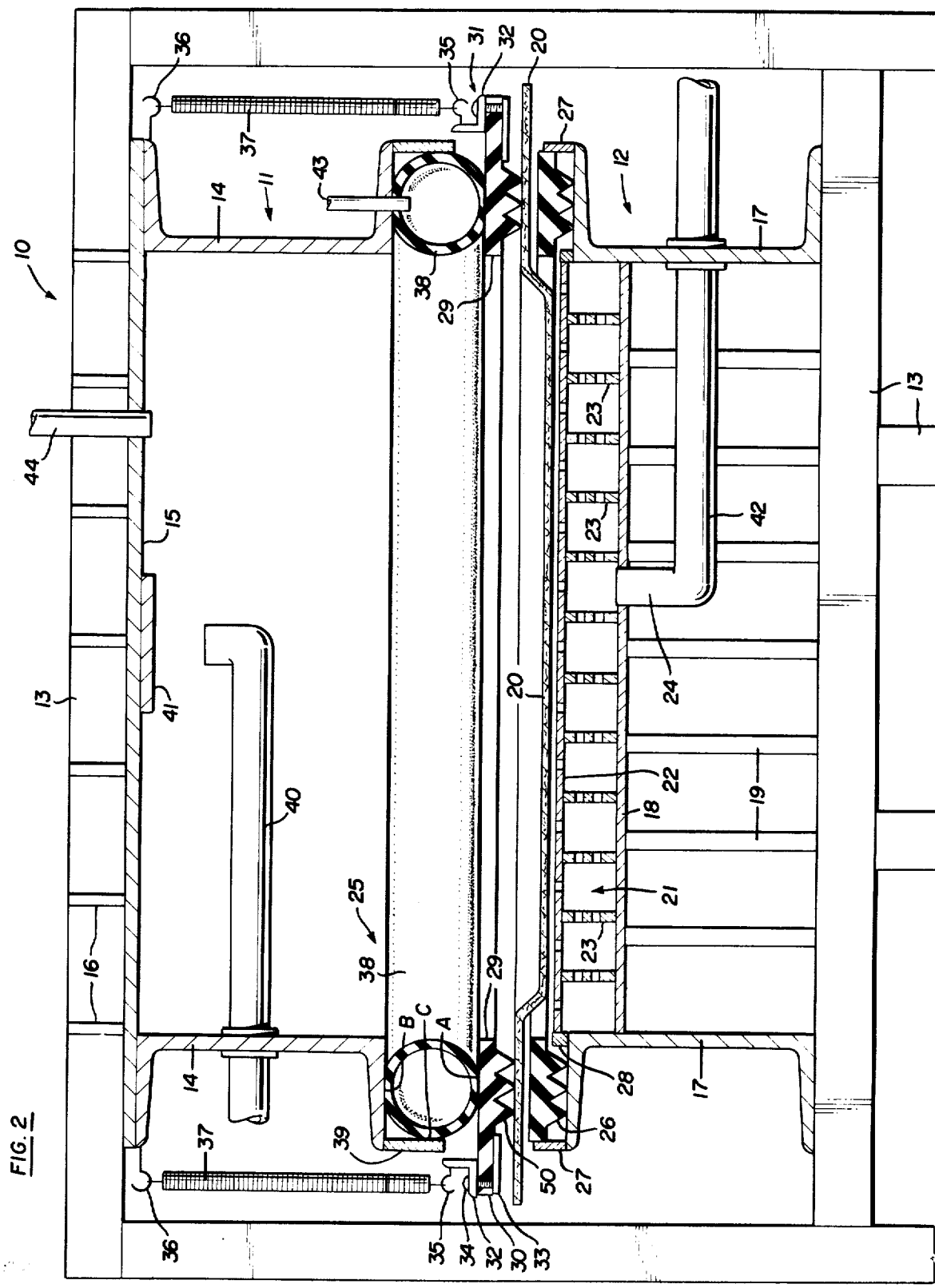

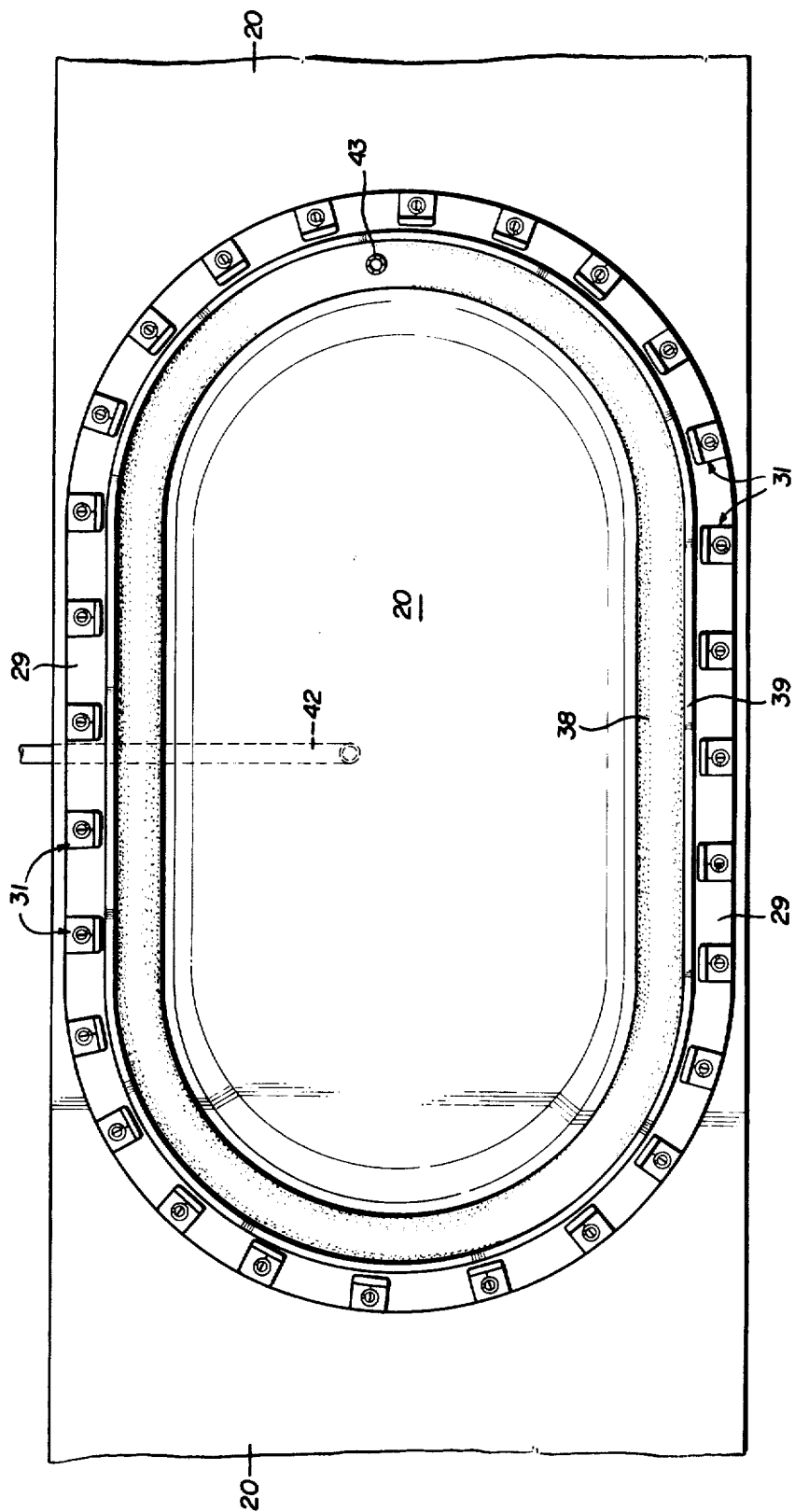

APPARATUS AND METHOD FOR FILTER SEAL

BACKGROUND OF THE INVENTION

1. Field of the Invention

The present invention relates to an apparatus and method for sealing a pressure filter assembly, and more particularly to an inflatable tube and moveable gasket interposed between fixed upper and lower filter frames.

2. The Prior Art

The method and apparatus of filtering particulate contaminants from a liquid under pressure through a two-dimensional, sheet-type filter medium is very well known to those skilled in the art. There exist a multiplicity of devices which accomplish this type of pressure filtration, the earliest of such devices being illustrated in U.S. Pat. Nos. 2,867,324 2,867,325, 2,867,326 3,306,458, and 3,333,693, all issued to the present applicant.

These filters all operate under the same basic principal: Contaminated liquid enters an upper pressurized shell, flows through a two dimensional (sheet) filter medium resting on a supporting grate, and then into a lower filtrate chamber.

During filtration there must be a liquid-tight seal engaging the filter media situated between the upper inlet chamber and lower filtrate chamber. In U.S. Pat. Nos. 2,867,325 and 2,867,326, the disclosed seal consists of a resilient gasket affixed to the outer extremities of the upper and lower shells. The upper shell is moveable and engages the filter media situated between the parts of the gasket sealing means. In U.S. Pat. No. 3,333,693, the disclosed device is comprised of fixed upper and lower shells which utilize a telescope seal frame on which the sealing gasket is affixed.

U.S. Pat. Nos. 2,867,324 and 3,306,458 show filtration devices which are also comprised of fixed upper and lower shells; these devices, however, utilize an inflatable peripheral seal between the shells, in contrast to the previously, described prior art structures. These particular devices have exhibited the drawback of "weeping", the name given to the leakage of filtrate liquid past the inflatable sealing devices.

The instant invention concerns itself with pressure filters comprised of a sealing means interposed between a fixed upper inlet shell and a fixed lower filtrate shell. One major advantage afforded by the presently proposed structure involves certain economies of construction and design associated with pressure filters comprised of fixed upper and lower shells. Further, a design of fixed shells better lends itself to multiple or tiered filtration units, which are necessary to provide a large filter area for the filtration and dewatering of certain chemical and waste sludges.

The telescope seal frame shown in U.S. Pat. No. 3,333,693, through functionally very effective, is somewhat difficult to assemble and maintain. The inflatable seals of U.S. Pat. Nos. 2,867,324 and 3,306,458 are functionally very simple; however, these inflatable seals are extremely difficult to manufacture because they must be virtually uniform throughout. Present extruding and casting techniques for resilient seal material do not render themselves to economical production of inflatable seals of this type.

It thus becomes a primary object of the present invention to propose a simple and economical sealing means for a pressure filter which is comprised of fixed inlet and outlet chambers.

It is a further object of the present invention to utilize materials in the sealing means which are of economical construction and which lend themselves to current methods of manufacture and fabrication.

It is yet another object of the present invention to propose a sealing means which leads itself to easy installation and economical maintenance.

SUMMARY OF THE INVENTION

As previously stated, the present invention includes a sealing method and apparatus for use in a pressure filter which is comprised of a two-dimensional (sheet) filter medium interposed between a fixed upper inlet chamber for particulate-contaminated liquid and a lower fixed filtrate or outlet chamber.

In the preferred embodiment, the sealing means is comprised in part of a resilient gasket situated below the filter medium and resting on the periphery of the lower filtrate chamber. A second gasket is situated directly above the first gasket, overlying the sheet filter medium, and is mounted to "float" vertically to engage or disengage the filter medium to permit its replacement after a filtration cycle.

An inflatable hose is situated above the second gasket and in contact with the periphery of the lower portion of the upper inlet chamber to force the second gasket downwardly against the filter medium into a liquid tight seal with the first gasket. The inflatable hose also performs a sealing function at the contact regions between itself and the second sealing gasket and between itself and the upper inlet chamber.

Accordingly, the present invention accomodates the economies of pressure filter construction afforded by fixed upper and lower frame members. Specifically, the hydraulic structure for raising and lowering a movable frame member is eliminated by the sealing arrangement proposed by the present invention. But even more importantly, the instant invention further provides economy in construction over prior art inflatable seals while at the same time eliminating the seepage of filtrate liquid experienced by such prior art devices.

Further advantages inherent in the overall construction of the present invention will become apparent from the following detailed description and claims.

BRIEF DESCRIPTION OF THE DRAWINGS

FIG. 1 is an elevation view of a preferred embodiment of the present invention.

FIG. 2 is a cross-sectional elevation view of the embodiment of FIG. 1 taken along section line 2—2 of FIG. 1.

FIG. 3 is a plan view taken along section line 3—3 of FIG. 1 illustrating the relationship of the various components of the seal and the pressure filter outer periphery configuration.

DETAILED DESCRIPTION OF THE INVENTION

Pressure filter 10 of the present invention is comprised of a fixed upper inlet chamber 11 and a fixed lower filtrate chamber 12. The filter 10 is suitably supported by structural and reinforcement members 13 above and below, respectively, the upper and lower filtrate chambers.

The upper inlet chamber 11 in the preferred embodiment is comprised of sidewall channel members 14 and an upper wall consisting of a plate member suitably reinforced by ribs 16. Upper shell 11 is permanently affixed to the upper support frame members 13. The lower filtrate chamber is comprised of sidewall channel members 17 and bottom wall plate member 18, which is suitably reinforced by ribs 19. Lower filtrate chamber 12 is also suitably and permanently affixed to reinforcement frame members 13.

Situated between the upper chamber 11 and the lower chamber 12 is sheet filter medium 20 which may be comprised of any one of a number of commonly used filter media such as woven cotton, cloth, or synthetic fibers, or a non-woven material comprised of either nylon, polyester, or rayon. Filter media 20 rests upon and is supported by grate member 21 which is comprised of a perforate plate 22 and reinforcing ribs 23. As shown in the embodiment of FIG. 2, grate member 21 rests upon and is in turn supported by lower wall 18. Reinforcing ribs 23 are perforate to permit the flow of filtrate toward outlet port 24.

The previous disclosure sets forth a description of a suitable and preferred basic filter structure consisting of a fixed upper inlet chamber and a fixed lower filtrate chamber, such structure being well known to those familiar with the art. Other structures, for example those shown in U.S. Pat. Nos. 2,867,324 and 3,306,458, would be equally suitable to the application of the present invention.

The seal represented by reference numeral 25 comprises the inventive aspects of the instant disclosure and includes three primary components. The first is a lower peripheral gasket 26 defining a support ledge surface. In the preferred embodiment gasket 26 is comprised to an extruded resilient material such as Buna-N-rubber. Gasket 26 rests upon the upper flange of channel wall member 17 and is held in place by outer and inner restraining plates 27 and 28, respectively, both of which are suitably affixed to the upper flange of channel member 17. In the preferred embodiment gasket 26 is not affixed to any structural component and is thus readily removable for replacement or repair. Further, gasket 26 is not a critical part of the seal 25 and may be dispensed with in some cases. However, to obtain the best liquid-tight seal between filter media 20 and lower filtrate chamber 12, gasket 26 should be used as part of seal 25.

The second basic component part of seal 25 is an upper peripheral gasket 29 which is situated directly above lower gasket 26 and also above filter media 20. Like lower gasket 26, upper gasket 29 is comprised of an extruded resilient material such as Buna-N-rubber in preferred embodiment. As illustrated in FIG. 2, sealing gasket 29 includes a plurality of serrations, or triangular-shaped projections, 50 which engage the filter medium 20 to provide a water-tight seal between the upper and lower gaskets. This particular configuration has been shown to be quite effective in the total combination the present invention; however, other suitable gasket configurations may be employed.

The gasket 29 further includes a continuous flange 30 to which a plurality of connectors 31 are fastened. Connectors 31 are comprised of angle members and reinforcing plates 33 which are suitably affixed to flange member 30 of upper gasket 29 by fasteners 34. A hook 35 is affixed to each angle member 32, and is interconnected to a hook 36 affixed to the upper flange of channel member 14 by the opposite ends of a spring 37. These springs 37 are always in tension and continually act as an upward force to raise gasket 29.

Situated directly above and in contact with the upper side of upper gasket 29 is a hose which in the preferred embodiment may be any one of a number of common rubber industrial hoses currently manufactured and readily available as "shelf" items. The hose 38 has a dual function: first, it serves as an actuating member when inflated to force gasket 29 against and in liquid-tight seal with filter media 20 and lower gasket 26; and second, it serves as a sealing member at contact regions A (with upper gasket 29), B (with the lower flange of channel member 14) and C (with a restraining plate member 39).

It can further be appreciated that the seals at regions A, B, and C are enhanced when the pressure in inlet chamber 11 is increased. Since the hose 38 is exposed to the pressure of the contaminated liquid in chamber 11, any increase in liquid pressure acts upon the exposed surface of the hose. As a result, the inflating fluid within the hose is compressed to correspondingly increase the pressure at the regions where it contacts the upper gasket 29, the upper channel 14, and the restraining plate 39. Further, the spring biasing means 37 not only affords a quick means of opening the filter assembly to replace a contaminated medium, but also acts to increase the pressure at regions A, B and C in order to achieve a water-tight seal.

Plate member 39 is continuous and is suitably affixed to the lower flange channel member 14. It serves to restrain the outward movement of inflated hose 38 resulting from the outward pressure force existing within upper chamber 11 during a filtration cycle.

For purposes of clarity many of the details of the operation and construction of filter 10 are not shown. For example, suitable controls, valving and other details applicable to the operation of the instant device are not illustrated in the present application but are shown in U.S. Pat. No. 2,867,324, which is incorporated by reference. However, by way of simplified explanation, contaminated liquid enters the upper inlet chamber 11 under pressure through line 40 and is distributed by a splash plate 41. The contaminated liquid flows through filter medium 20, where particulate contaminants are deposited. The resulting filtered liquid then flows through the perforate grate 22, perforate ribs 23, and out through port 24 and outlet line 42.

During the filtration cycle, hose 38 is inflated by means of pressurized air entering through a flexible tube 43, which can be controlled by a conventional four-way valve. Hose 38, when inflated, makes liquid-tight contacts with the upper gasket 29, the inlet chamber channel 14, and the restraining plate 39 at regions A, B, and C, respectively. The force of inflated hose 38, which must be sufficient to overcome the tension force in springs 37, causes gasket 29 to push against filter media 22 and in turn against lower gasket 26 to form a completed liquid-tight seal between the upper and lower filter chambers 11 and 12.

After the filtration cycle, the length of which may be determined by total flow or a pressure differential existing between upper inlet chamber 11 and lower filtrate chamber 12, the flow of contaminated liquid through line 40 is terminated. Pressurized air is then forced into upper inlet chamber 11 through a line 44, which is closed during the filtration cycle. This evacuates the upper inlet chamber of any liquid which may be standing in the chamber 11 after the flow of liquid has been stopped through line 40. After the evacuation of the liquid from the upper chamber 11, hose 38 is deflated by releasing the pressure supplied by the line 43 and pulling a vacuum through the same line. This causes a rapid folding and deflation hose 38. The tension force on spring 37 causes upper gasket 29 to disengage from filter media 20 and pull upwardly to a height adequate to permit a replacement of filter media 20, which is coated with particulate contaminants.

The contaminated filter medium is then replaced with a clean medium, after which the vacuum pulled through line 43 is relieved and pressurized air is once again forced through line 43 to inflate hose 38. This in turn forces gasket 29 in sealing contact with filter media 20 and lower gasket 26, and also forms contact regions A, B, and C. The flow of contaminated liquid through line 40 may then begin again for the start of a new filtration cycle.

It should be clear from the plan view of FIG. 3 that the sealing means 25 is continuous and is without sharp corners. The continuous aspect of seal means 25 permits the use of ordinary and readily available hose as inflatable hose 38. Both the gaskets 26 and 29 and hose 38 may be joined and made continuous by vulcanizing or other joining techniques currently available.

In the preferred embodiment gaskets 26 and 29 and the hose 38 are independent components not permanently affixed to each other or other structural members of filter 10. This preferred embodiment results in the most economical method of manufacture and installation of seal 25. It also permits less laborious maintenance or replacement of the seal components. Either the individual components or the whole seal may be replaced with the same degree of ease. However, hose 38 could very well be made to be in permanent sealing contact with the lower flange of channel wall member 14 or in permanent contact with upper gasket 29.

The foregoing description of the preferred embodiment is merely exemplary of the present invention, rather than limiting in any sense. It is intended that the present invention include all innovations and modifications which will become apparent to those skilled in the art from the present description.

Having fully and completely set forth my invention, I now claim:

1. In a pressure filter having a filter medium interposed, between fixed, vertically spaced upper and lower chambers, the improvement of sealing means normally sealing the chambers to one another, said sealing means including a support ledge surface encircling one of the chambers and engaging the filter medium, a gasket peripherally encircling the other chamber and being vertically aligned with the support ledge for contacting the filter medium, means constantly biasing said gasket vertically away from the ledge surface, a radially distensible tube vertically interposed between said gasket and the other said chamber, said tube being vertically aligned with said gasket for sealing said other chamber around its entire periphery, and means for injecting fluid under pressure into said tube to radially distend the tube and (a) to displace the gasket into sealing engagement with the filter medium and the ledge, (b) to urge the tube into sealing engagement with the gasket, (c) to increase the tension on said biasing means, and (d) to close said other chamber for filtration flow, wherein said tube is collapsed upon deflation and said biasing means thereupon displaces the gasket from said support ledge to accommodate the removal of said filter medium.

2. The pressure filter as defined in claim 1, characterized by said chambers being defined by a pair of liquid conducting shells, and said biasing means including a plurality of tension springs interconnecting said gasket and the shell defining said other chamber.

3. The as defined in claim 2, characterized by said support ledge surface being defined by a resilient sealing gasket supported by the shell defining to one chamber.

4. In a pressure filter having fixed, vertically spaced upper and lower chambers and a sheet filter medium interposed between the chambers, each chamber having an encircling sealing surface and said sealing surfaces being spaced and vertically aligned, wherein contaminated liquid enters one of said chambers under pressure, flows through said sheet filter medium for the removal of particulate contaminants, and exits through the other chamber, the improvement of a vertically displaceable sealing gasket interposed between said filter medium and the sealing surface of one of said chambers, a separate inflatable tube interposed between and unattached to the sealing gasket and the sealing surface of said one chamber, means for injecting fluid under pressure into said tube to radially distend the tube and (a) displace the gasket into sealing engagement with the filter medium and the sealing surface of the other chamber, (b) to urge the tube into sealing engagement with the gasket, and (c) to urge the tube into sealing engagement with the sealing surface the of said one chamber, and constantly acting means for displacing the gasket away from the sealing surface of the other chamber upon collapse of the tube by deflation, to accomodate the removal of said filter medium.

5. In a pressure filter having a filter medium interposed between fixed, vertically spaced upper and lower shell members, the upper shell member defining an inlet chamber for contaminated liquid under pressure, said shells having opposed peripheral sealing surfaces, the improvement of a vertically displaceable gasket overlying the filter medium and being aligned with the sealing surface of said lower shell, an inflatable tube interposed between and unattached to said gasket and the sealing surface on said upper shell, and means for inflating said tube to establish respective water-tight seals between (a) the upper shell and the tube, (b) the tube and the gasket, and (c) the gasket and the lower shell, and means constantly biasing said gasket away from the lower shell, wherein the gasket is vertically displaced upon deflation of the tube to accomodate replacement of the filter medium.

6. In a pressure filter having fixed, vertically spaced upper inlet and lower chambers having opposed peripheral sealing surfaces and a sheet filter medium interposed between the chambers, wherein contaminated liquid enters said inlet chamber under pressure, flows through said sheet filter medium for the removal of particulate contaminants, and exits through the outlet chamber, the improvement of a vertically displaceable sealing gasket interposed between said filter medium and the outer peripheral sealing surface of one of said chambers, an inflatable tube interposed between the sealing gasket and the outer peripheral sealing surface of said one chamber, and means for inflating said tube to seal said inlet and outlet chambers by expanding the tube to urge the sealing gasket against the filter medium as supported by the peripheral sealing surface of the other chamber thereby establishing respective water tight seals between (a) the tube and the gasket, and (b) the gasket and the other chamber, and means constantly biasing said displaceable sealing gasket toward said inflatable tube (a) to increase the pressure upon the inflatable tube for enhancing the seal, and (b) to accommodate the movement of said displaceable gasket away from said other chamber upon deflation of said tube to facilitate the replacement of the filter medium.

* * * * *